(12) United States Patent
Uysal et al.

(10) Patent No.: US 12,376,194 B2
(45) Date of Patent: Jul. 29, 2025

(54) EXHAUST GAS HEATER

(71) Applicant: Purem GmbH, Neunkirchen (DE)

(72) Inventors: Fatih Uysal, Plochingen (DE); Sandra Höckel, Esslingen am Neckar (DE)

(73) Assignee: Purem GmbH, Neunkirchen (DE)

( * ) Notice: Subject to any disclaimer, the term of this patent is extended or adjusted under 35 U.S.C. 154(b) by 258 days.

(21) Appl. No.: 18/163,663

(22) Filed: Feb. 2, 2023

(65) Prior Publication Data

US 2023/0247726 A1   Aug. 3, 2023

(30) Foreign Application Priority Data

Feb. 2, 2022   (DE) .................... 10 2022 102 376.1

(51) Int. Cl.
| | |
|---|---|
| *H05B 3/06* | (2006.01) |
| *F01N 3/027* | (2006.01) |
| *F01N 3/20* | (2006.01) |
| *H05B 3/10* | (2006.01) |

(52) U.S. Cl.
CPC ............... *H05B 3/06* (2013.01); *F01N 3/027* (2013.01); *F01N 3/2013* (2013.01); *H05B 3/10* (2013.01); *F01N 2240/16* (2013.01); *H05B 2203/022* (2013.01)

(58) Field of Classification Search
CPC ...... H05B 3/06; H05B 3/10; H05B 2203/022; H05B 3/32; F01N 3/027; F01N 3/2013; F01N 2240/16; F01N 13/1872; F01N 3/28
See application file for complete search history.

(56) References Cited

U.S. PATENT DOCUMENTS

| | | | | | |
|---|---|---|---|---|---|
| 4,548,625 | A | * | 10/1985 | Ishida ..................... | F01N 3/027 60/303 |
| 4,723,973 | A | * | 2/1988 | Oyobe .................... | F01N 3/027 60/303 |
| 4,730,454 | A | * | 3/1988 | Pischinger ............ | F01N 3/0275 95/278 |
| 5,463,206 | A | * | 10/1995 | Abe ....................... | F01N 3/2867 392/491 |
| 5,536,478 | A | * | 7/1996 | Lipp ....................... | H05B 3/08 422/174 |
| 6,043,463 | A | * | 3/2000 | Plumptre ............... | H05B 3/748 219/460.1 |
| 2014/0322090 | A1 | | 10/2014 | Brueck et al. | |

(Continued)

FOREIGN PATENT DOCUMENTS

| | | |
|---|---|---|
| DE | 20 2021 100 999 U1 | 3/2021 |
| DE | 10 2020 123 376 A1 | 3/2022 |

(Continued)

*Primary Examiner* — Matthew T Largi
(74) *Attorney, Agent, or Firm* — Walter Ottesen, P.A.

(57) ABSTRACT

An exhaust gas heater for an exhaust gas system of an internal combustion engine includes a carrier arrangement through which exhaust gas can flow in the direction of an exhaust gas heater longitudinal axis. The exhaust gas heater includes at least one heating conductor supported on the carrier arrangement. The at least one heating conductor is made with bent flat material for the provision of a heating conductor profile which is meandering at least in regions thereof. The heating conductor flat end faces are opposite one another and the heating conductor broad sides are opposite one another.

21 Claims, 7 Drawing Sheets

(56) References Cited

U.S. PATENT DOCUMENTS

| | | | |
|---|---|---|---|
| 2017/0016371 A1* | 1/2017 | Schlipf | H05B 3/48 |
| 2017/0273146 A1* | 9/2017 | Everly | H05B 3/16 |
| 2020/0072107 A1* | 3/2020 | Aufranc | F01N 3/2013 |
| 2022/0074333 A1 | 3/2022 | Hoeckel et al. | |
| 2022/0290595 A1 | 9/2022 | Uysal et al. | |
| 2023/0061713 A1 | 3/2023 | Hammer et al. | |
| 2023/0129655 A1* | 4/2023 | Steigert | H05B 3/32 |
| | | | 219/205 |

FOREIGN PATENT DOCUMENTS

| | | |
|---|---|---|
| EP | 4 060 169 A1 | 9/2022 |
| EP | 4 141 229 A1 | 3/2023 |
| WO | 2013/104754 A1 | 7/2013 |

\* cited by examiner

Fig. 11 ations.
EXHAUST GAS HEATER

CROSS-REFERENCE TO RELATED APPLICATIONS

This application claims priority of German patent application no. 10 2022 102 376.1, filed Feb. 2, 2022, the entire content of which is incorporated herein by reference.

TECHNICAL FIELD

The present disclosure relates to an exhaust gas heater for an exhaust gas system of an internal combustion engine, including a carrier arrangement through which exhaust gas can flow substantially in the direction of an exhaust gas heater longitudinal axis and at least one heating conductor supported on the carrier arrangement.

BACKGROUND

Such an exhaust gas carrier is generally used to heat exhaust gas of an internal combustion engine which flows through an exhaust gas system or another gas conducted through an exhaust gas system in order to transmit the heat transmitted to the exhaust gas or gas in a region of the exhaust gas system downstream in relation to the exhaust gas heater to other system regions, for example, an exhaust gas treatment unit such as, for example, a catalytic converter or particle filter, in order in particular in a starting phase of the combustion process or before the start of the combustion process of an internal combustion engine to bring such system regions as rapidly as possible to operating temperature.

US 2022/0074333 discloses an exhaust gas heater in the case of which a heating conductor is formed with a multiplicity of heating conductor meandering fields. In each heating conductor meandering field, meandering portions arranged in a staggered manner radially with respect to one another run substantially in the circumferential direction. The heating conductor is provided as a material piece by separating out from a metal flat material, as a result of which it becomes possible to provide the heat conductor with a large degree of freedom in terms of the shaping of the individual heating conductor meandering fields or the meandering portions in the individual heating conductor meandering fields.

SUMMARY

It is an object of the present disclosure to provide an exhaust gas heater for an exhaust gas system of an internal combustion engine with which an increased degree of heating efficiency can be achieved.

According to the disclosure, this object is achieved by an exhaust gas heater for an exhaust gas system of an internal combustion engine, including a carrier arrangement through which exhaust gas can flow substantially in the direction of an exhaust gas heater longitudinal axis and at least one heating conductor supported on the carrier arrangement.

The at least one heating conductor is constructed with bent flat material, for the provision of a heating conductor profile which is meandering at least in regions, with heating conductor flat sides opposite one another and heating conductor broad sides opposite one another.

In the case of the structure according to the disclosure of an exhaust gas heater, the heating conductor is not provided by separating out, that is, for example, punching out or cutting out from a metal flat material with defined shaping, but rather in that a, for example, band-like flat material is bent into the form intended for the heating conductor. As a result of this, it becomes possible to provide the heating conductor with a structure which is very thin in particular transversely to the exhaust gas flow direction, but is expanded comparatively widely in the exhaust gas flow direction, as a result of which on one hand the flow resistance in the exhaust gas heater is reduced, while on the other hand a comparatively large surface which can be used for heat transmission can be provided.

This can be achieved in particular if the at least one heating conductor with its heating conductor broad sides is arranged extending substantially in the direction of the exhaust gas heater longitudinal axis and with its heating conductor flat sides is arranged extending substantially orthogonally to the exhaust gas heater longitudinal axis.

According to one particularly advantageous aspect of the present disclosure which is also independent of the manner how the shaping of the heating conductor is provided, it is proposed that the at least one heating conductor includes at least one heating conductor meandering field with a multiplicity of meandering portions which are longitudinally extended in the direction of a meandering portion longitudinal direction and are substantially parallel to one another, directly adjacent meandering portions in each case in one of their meandering portion end regions being connected to one another by a meandering portion connecting portion transversely to the meandering portion longitudinal direction. Very tight packing of the individual meandering portions and thus a large surface in relation to the overall cross-section through which exhaust gas can flow for heat transmission are achieved with such an arrangement.

A further increase in the surface available for heat treatment can be achieved in that at least one, preferably substantially each meandering portion is formed between its meandering portion end regions at least in regions in an undulating manner with a multiplicity of consecutive wave crests in the meandering portion longitudinal direction.

In particular if the heating conductor is provided by flat material bent into the desired form, it is advantageous for as simple as possible production if the at least one heating conductor includes at least two heating conductor meandering fields, a first heating conductor meandering field of the at least two heating conductor meandering fields providing a first connector region for connecting the at least one heating conductor to a voltage source and a second heating conductor meandering field of the at least two heating conductor meandering fields providing a second connector region for connecting the at least one heating conductor to the voltage source.

In this case, at least one heating conductor meandering field can be provided by a single heating conductor material piece. This means that such a heating conductor meandering field can be provided without having to connect various or separately formed material pieces to one another mechanically or in an electrically conducting manner. It is particularly advantageous in this case if all the heating conductor meandering fields are provided by a single heating conductor material piece, hence no connecting processes for joining together separate material pieces are required in order to provide the overall heating conductor.

In particular in the case of larger dimensions of an exhaust gas heater or a comparatively complex profile of the heating conductor, it may be advantageous for simple production if at least two heating conductor meandering fields are provided by separate heating conductor material pieces.

In this case, the structure can be simplified by using identical parts if at least two, preferably all the heating conductor meandering fields provided by separate heating conductor material pieces are formed to have substantially the same shape as one another.

In order in heating operation to achieve as uniform as possible flowing through of the exhaust gas heater in its entire cross-section, it is proposed that at least two heating conductor meandering fields provided by separate heating conductor material pieces are formed substantially in mirror symmetry to one another in relation to a plane of symmetry which contains the heating conductor longitudinal axis.

If the heating conductor is formed with two heating conductor meandering fields provided by separate heating conductor material pieces, the two heating conductor meandering fields can be arranged substantially in mirror symmetry to one another in relation to a plane of symmetry containing the heating conductor longitudinal axis. If the heating conductor is formed, for example, with four heating conductor meandering fields provided by separate heating conductor material pieces, the four heating conductor meandering fields can be arranged in each case in pairs substantially in mirror symmetry to one another in relation to two planes of symmetry which contain the heating conductor longitudinal axis and are orthogonal to one another.

According to a further aspect of the present disclosure, which independently, in particular, however, also in combination with the configuration aspects discussed above contributes to a particularly advantageous structure of an exhaust gas heater, the carrier arrangement can include a carrier housing with a housing base which is arranged on a first axial side of the at least one heating conductor and extends substantially transversely to the exhaust gas heater longitudinal axis, wherein a multiplicity of exhaust gas throughflow openings is provided in the housing base, and wherein the at least one heating conductor is supported by a multiplicity of carrier elements on the housing base.

In order on one hand to ensure stable mounting of the heating conductor on the carrier arrangement, on the other hand to keep the flow resistance introduced as a result as low as possible, it is proposed that at least one, preferably each carrier element includes a carrier pin fixed on the housing base as well as a carrier sleeve supported on the carrier pin, with the interposition of electrically insulating material, preferably magnesium oxide material, and fixed on the at least one heating conductor, or/and at least one, preferably each carrier element with a carrier element longitudinal axis is arranged substantially parallel to the exhaust gas heater longitudinal axis.

For a configuration which is easy to realize, is also mechanically stable and in particular also exhaust gas-resistant and temperature-resistant, the carrier housing as well as the carrier pin and the carrier sleeve of the at least one, preferably each carrier element can be constructed with metal material. The carrier pin of the at least one, preferably each carrier element can be connected to the housing base by material connection, preferably welding or soldering. The carrier sleeve of the at least one, preferably each carrier element can furthermore be connected to the at least one heating conductor by material connection, preferably welding or soldering.

In particular when the heating conductor is constructed with several material pieces provided separately from one another, it is advantageous for a stable structure and to achieve an electrically conducting connection of all the material pieces to one another if at least two heating conductor meandering fields provided as separate heating conductor material pieces are connected to one another in an electrically conducting manner via at least one carrier element which supports them on the carrier housing.

In order, for example, to be able to bind the carrier housing to a tube-like or housing-like exhaust gas guidance component of an exhaust gas system, this can have a circumferential wall which adjoins the housing base radially on the outside.

The carrier housing can be formed in a pot-shaped manner with the housing base and the circumferential wall. In order on one hand to achieve a defined guidance of flow, on the other hand to keep the flow resistance as low as possible and at the same time be able to provide a large heat transmission surface, it is furthermore proposed that the at least one heating conductor on a second axial side is substantially not covered by the carrier arrangement or/and the at least one heating conductor on the second axial side projects axially over the circumferential wall.

The disclosure furthermore relates to an exhaust gas system for an internal combustion engine, including at least one exhaust gas treatment unit, preferably catalytic converter or/and particle filter, and at least one exhaust gas heater constructed according to the disclosure in an exhaust gas main flow direction upstream in relation to the at least one exhaust gas treatment unit.

BRIEF DESCRIPTION OF DRAWINGS

The invention will now be described with reference to the drawings wherein.

DETAILED DESCRIPTION

Before various embodiments of an exhaust gas heater which can be used in an exhaust gas system of an internal combustion engine are described below with reference to FIGS. 1 to 10, it will be explained with reference to FIG. 11 how such an exhaust gas heater is integrated into an exhaust gas system of an internal combustion engine, for example, in a vehicle.

Figure 11:
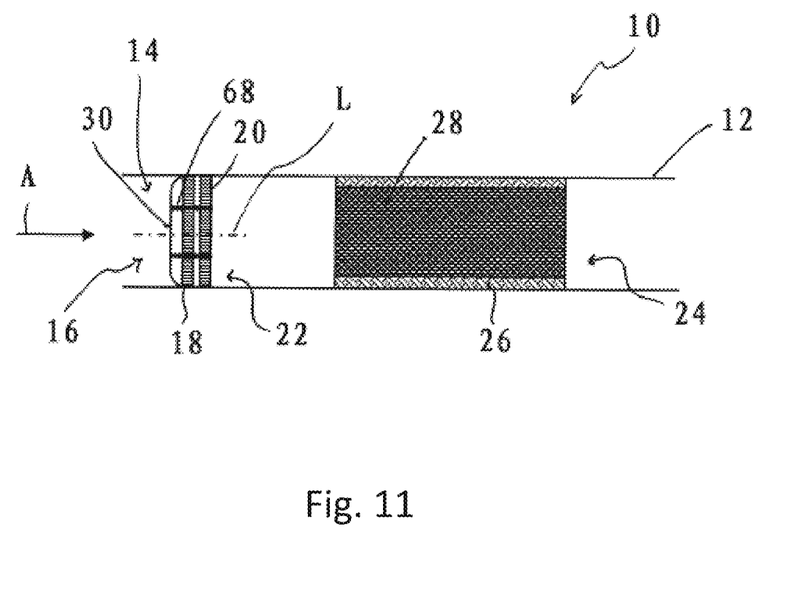
FIG. 11 shows a representation in principle of an exhaust gas system which contains an exhaust gas heater and an exhaust gas treatment unit for an internal combustion engine.

FIG. 11 shows, in a representation in principle, such an exhaust gas system 10 with a tube-like or housing-like exhaust gas guidance component 12 which may be composed of several parts. In an upstream region of this exhaust gas guidance component 12, an exhaust gas heater generally designated by 14 is arranged in such a manner that exhaust gas which is supposed to flow in an exhaust gas main flow direction A in the exhaust gas guidance component 12 onto the exhaust gas heater 14 flows onto the exhaust gas heater on a first axial side 16. The exhaust gas flows through the exhaust gas heater 14, which exhaust gas, when flowing through the exhaust gas heater 14, absorbs heat from two heating conductors 18, 20 arranged consecutively in the direction of an exhaust gas heater longitudinal axis L. After flowing through the exhaust gas heater 14 or the heating conductors 18, 20 arranged consecutively in the exhaust gas main flow direction A or in the direction of the exhaust gas heater longitudinal axis L, the heated exhaust gas flow leaves the exhaust gas heater 14 at a second axial side 22 and flows towards an exhaust gas treatment unit 24 arranged downstream of the exhaust gas heater 14. The exhaust gas treatment unit 24 can be formed, for example, as a catalytic converter and includes a catalytic converter block 28 supported in the exhaust gas guidance component 12, for example, by a fiber-like storage material 26.

The exhaust gas heated in the exhaust gas heater 14 or another gas introduced into the exhaust gas guidance components 12 and flowing through the exhaust gas heater 14 transmits heat to the exhaust gas treatment unit 24 that it can be brought to the temperature required to carry out the catalytic reaction rapidly in particular prior to or during putting into service of the internal combustion engine and the period of time in which exhaust gas is emitted substantially without a cleaning effect can be significantly reduced.

A first embodiment of such an exhaust gas heater 14 is explained in greater detail below with reference to FIGS. 1 to 5.

The exhaust gas heater 14 includes a carrier arrangement generally designated by 30 on which, in the represented embodiment, the two heating conductors 18, 20 arranged consecutively in the direction of the exhaust gas heater longitudinal axis L are supported. The carrier arrangement 30 includes a carrier housing 32 provided, for example, as a sheet-formed part with a housing base 34 arranged substantially transversely, that is, substantially orthogonally to the exhaust gas heater longitudinal axis L and a circumferential wall 36 which adjoins the housing base 34 radially on the outside. The carrier housing 32 thus has a substantially pot-shaped structure and covers with its housing base 34 the two heating conductors 18, 20 substantially only on the first axial side 16. On the second axial side 22, the carrier housing 32 is fundamentally open and covers the two heating conductors 18, 20 preferably in none of their radial regions.

In order to enable the exhaust gas to flow around the heating conductors 18, 20, several substantially evenly distributed exhaust gas throughflow openings 38 are formed in the housing base 34. If the exhaust gas heater 14, as is also indicated in FIG. 11, is positioned in such a manner in the exhaust gas system or the exhaust gas guidance component 12 itself that the housing base 34 or the first axial side 16 is oriented in an upstream direction and thus the exhaust gas flows in the exhaust gas main flow direction A toward the housing base 34 of the carrier housing 32, the exhaust gas enters in the region of the exhaust gas throughflow openings 38 into the interior of the carrier housing 32 in which the two heating conductors 18, 20 are positioned. The exhaust gas flows around the heating conductors 18, 20 substantially in a direction which corresponds to the exhaust gas main flow direction A or the exhaust gas heater longitudinal axis L and, after thermal interaction with the heating conductors 18, 20, leaves the carrier housing 32 on the fundamentally open second axial side 22.

It should be pointed out that in principle the exhaust gas heater 14 could also be integrated into the exhaust gas system 10 in a different orientation so that the exhaust gas flowing in the exhaust gas main flow direction A towards the exhaust gas heater enters on the second axial side 22 into the carrier housing 32 and after flowing around the heating conductors 18, 20 in the region of the exhaust gas throughflow openings 38 exits from the carrier housing 32 on the first axial side 16.

The fundamental structure of the two heating conductors 18, 20 is explained below with reference to the heating conductor 20 positioned closer to the second axial side 22. The two heating conductors 18, 20 are fundamentally the same as one another, but are not formed to be entirely identical, hence, when viewed in the direction of the exhaust gas heater longitudinal axis, they do not lie entirely congruently and thus an improved thermal interaction with the exhaust gas or gas flowing around them can be achieved. The following statements, however, also apply in principle to the structure of the heating conductor 18 positioned closer to the first axial side 16.

In the embodiment of an exhaust gas heater 14 represented in FIGS. 1 to 5, the heating conductor 18 is produced from a single heating conductor material piece 59. In particular, the heating conductor 18 is constructed from an electrically conducting, band-like flat material generally constructed with metal material which is bent to obtain the desired form of the heating conductor 20. The heating conductor 20 thus has mutually opposite broad sides 40, 42 which extend substantially in the direction of the exhaust gas heater longitudinal axis L or are oriented parallel thereto. The heating conductor 20 furthermore has heating conductor flat sides or end faces 44, 46 which are oriented substantially orthogonally to the heating conductor broad sides 40, 42 and also to the exhaust gas heater longitudinal axis L. As a result of the configuration of the heating conductor 20 or each heating conductor 18, 20 with flat material, it thus becomes possible to provide a large heat transmission surface via correspondingly large dimensioning of the broad sides 40, 42 even when using very thin flat material, that is, a flat material, in the case of which the flat sides 44, 46 have a correspondingly small extent or thickness. The extent of the heating conductor broad sides 40, 42 in the direction of the exhaust gas heater longitudinal axis can be, for example, more than five times, preferably more than ten times the extent of the heating conductor flat sides 44, 46 orthogonally to the exhaust gas heater longitudinal axis L. The or each heating conductor 18, 20 is thus substantially wider than it is thick.

Figure 3:
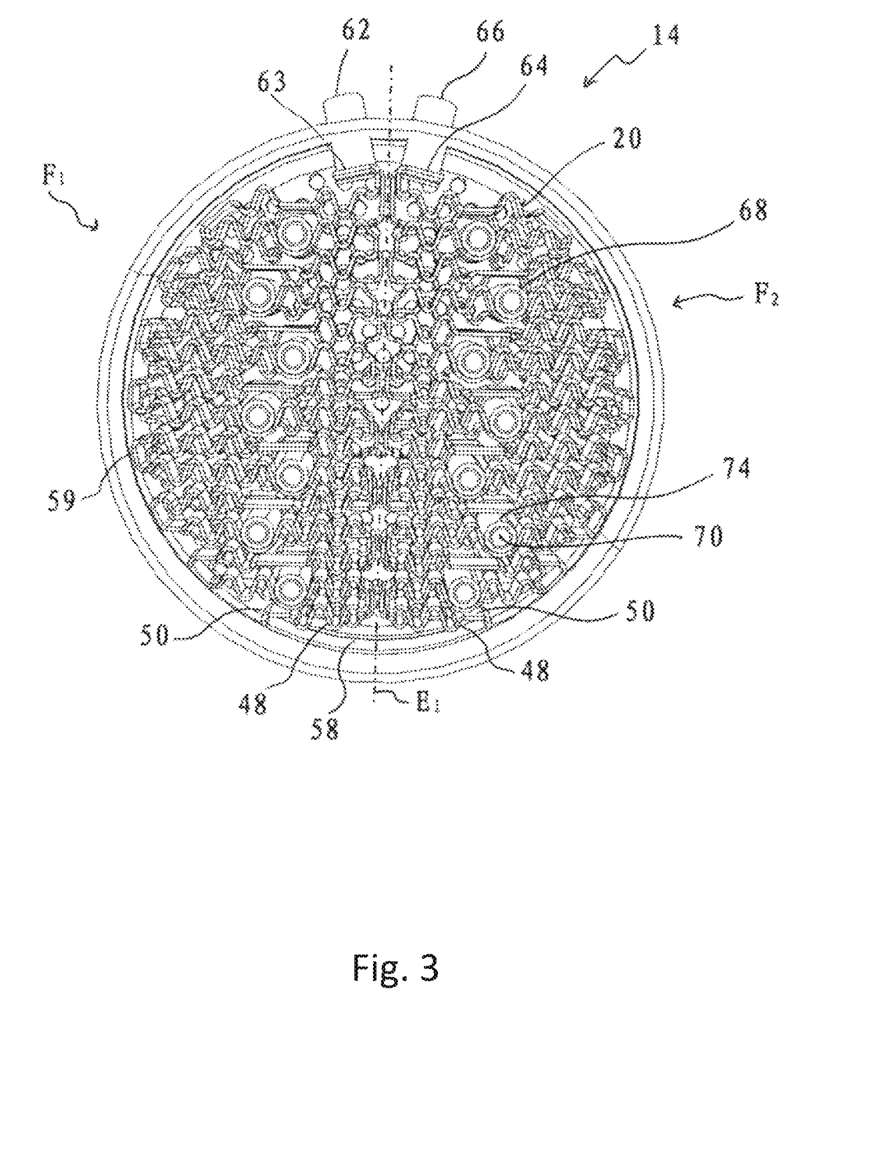
FIG. 3 shows an axial view of the exhaust gas heater of FIGS. 1 and 2, viewed on the second axial side.

The heating conductor 20 is bent into such a form that it provides two heating conductor meandering fields $F_1$, $F_2$ which lie in the view of FIG. 3 to the left and right of a plane of symmetry $E_1$ which contains the exhaust gas heater longitudinal axis L or is oriented parallel thereto. In each of the heating conductor meandering fields $F_1$, $F_2$, the heating conductor 20 is formed with meandering portions 48 which are longitudinally extended in a meandering portion longitudinal direction M and arranged running substantially parallel to one another. Meandering portions 48 which are directly adjacent to one another transversely to the meandering portion longitudinal direction M are connected to one another in each case in one of their meandering portion end regions 50, 52 located in the meandering portion longitudinal direction M via a respective meandering portion connecting portion 54, 56. A meandering profile of meandering portions 48 which are fundamentally longitudinally extended in each case in the meandering portion longitudinal direction M and are consecutive transversely to the meandering portion longitudinal direction M is thus produced in each of the heating conductor meandering fields $F_1$, $F_2$.

Figure 5:
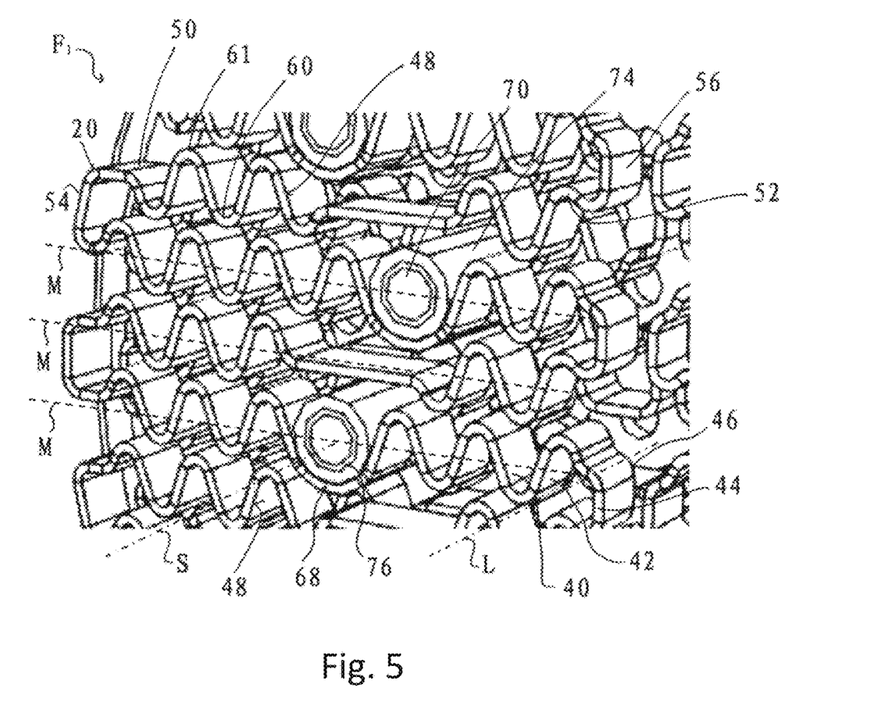
FIG. 5 shows a further detailed view of the exhaust gas heater of FIGS. 1 and 2.

It is clearly apparent in FIG. 5 that the meandering portions 48 lying next to one another transversely to the respective meandering portion longitudinal direction M have between their respective meandering portion end regions 50, 52 a fundamentally undulating profile with consecutive wave crests 60, 61 lying at a distance to one another transversely to the meandering portion longitudinal direction. The wave crests 60, 61 thus form an alternating sequence of wave peaks and wave troughs in the meandering portions 48 in the meandering portion longitudinal direction M.

As a result of the superimposition of this undulating structure of the individual meandering portions 48 on one hand and the fundamentally meandering structure of the heating conductor 20 in the heating conductor meandering fields $F_1$, $F_2$, alongside a compact configuration, a comparatively large total length of the heating conductor 20 and thus a large surface available overall for the transmission of heat are achieved. Equally, the overall structure of the heating conductor 18 can be easily adapted to the cross-sectional geometry of the carrier housing 32 which receives it, for example, the substantially circular cross-sectional geometry clearly apparent in FIG. 3, and an approximately identical surface which can be used for the transmission of heat can be provided substantially in each cross-sectional region.

In the case of the embodiment represented in FIGS. 1 to 5, the heating conductor 20 and likewise the heating conductor 18 are constructed from a single band-like heating conductor material piece 59. This means that, in order to produce the heating conductor 20 or 18, no processes are necessary to join together individual material pieces. By bending into the desired form with the two heating conductor meandering fields $F_1$, $F_2$, a configuration which is substantially mirror-symmetrical in relation to the plane of symmetry $E_1$ is achieved, in the case of which, in the region apparent at the bottom in FIG. 3, the two heating conductor meandering fields $F_1$, $F_2$ in the region of their respective lowermost meandering portions 48 adjoin one another via a meandering field connecting portion 58, which adjoins the meandering portion end regions 50, in each case close to the circumferential wall 36, of these two meandering portions 48 of the two heating conductor meandering fields $F_1$, $F_2$ and also forms a component of the heating conductor material piece 59 used to construct the heating conductor 20.

In the region apparent at the top in FIG. 3, the heating conductor 20 provides in the region of the first heating conductor meandering field $F_1$ a first connection region 63 in which the heating conductor 20 is or can be connected to a connector element 62 which penetrates through the circumferential wall 36 and possibly also a wall of the exhaust gas guidance component 12 in an electrically insulated manner and via this to a voltage source. The heating conductor 20 equally provides in its second heating conductor meandering field $F_2$ a second connector region 64 in which it can be connected to a voltage source via a connector element 66. In the represented example, in the case of which two heating conductors 18, 20 are arranged consecutively in the direction of the exhaust gas heater longitudinal axis L, these are preferably connected electrically parallel to one another and connected in an electrically conducting manner with a respective first connector region 63 to the connector element 62 and connected in an electrically conducting manner with a respective second connector region 64 to the connector element 66.

For stable mounting of the heating conductors 18, 20 on the carrier housing 32, a multiplicity of pin-like or bolt-like carrier elements 68 is provided. It is apparent in FIG. 3 that two rows of such carrier elements 68 are provided in assignment to each of the two heating conductor meandering fields $F_1$, $F_2$, wherein in each of these rows directly consecutive carrier elements 68 are offset with respect to one another transversely to a respective row longitudinal direction.

Each carrier element 68 includes a carrier pin 70 which is inserted into an assigned opening 72 in the housing base 34 and is fixed on the housing base 34, for example, by welding or soldering, that is, is in principle fixed by material connection in such a manner that the carrier pin 70 and thus the entire carrier element 68 with a carrier element longitudinal axis S extends substantially in the direction of the exhaust gas heater longitudinal axis L from the housing base 34.

Each carrier pin 70 is surrounded by a substantially cylindrically formed carrier sleeve 74. In order to achieve an electric insulation between a respective carrier pin 70 and the carrier sleeve 74 surrounding it, electrically insulating material 76, for example, ceramic material, such as, for example, magnesium oxide or the like, is arranged between these. This can be achieved, for example, in that, before a respective carrier sleeve 74 is pushed or pressed onto an assigned carrier pin 70, the carrier pin 70 is coated on its outer circumferential region which receives the carrier sleeve 74 with such an electrically insulating material.

In order in the case of each of the carrier elements 68 to ensure an electrical short-circuit between the carrier sleeve 74 and the housing base 34, the carrier pins 70 project with their longitudinal portions to be inserted into the openings 72 over the respectively assigned carrier sleeves 74 so that, in the case of carrier pins 70 inserted into the openings 72, the carrier sleeves 74 are positioned at a distance from the housing base 34.

The heating conductors 18, 20 are connected to the carrier sleeves 74 of the carrier elements 68 in the region of their meandering portions 48 formed in principle with an undulating structure. In this case, it can be provided, for example, that, where a connection of a meandering portion 48 to a carrier sleeve 74 is performed, a respective wave crest 60 in the meandering portion longitudinal direction M is slightly further extended than other wave crests such that a contour of the respective meandering portion 48 adapted to the outer circumferential contour of a respective carrier sleeve 74 is achieved in this region. In the longitudinal region which surrounds a respective carrier sleeve 74 or bears against it, a respective meandering portion 48 can be connected to the carrier sleeve 74 by material connection, that is, for example welding or soldering.

Since the carrier sleeves 74, just like the carrier pins 70, are preferably constructed with metal material, there is thus an electrically conducting connection between the heating conductors 18, 20 where the two heating conductors 18, 20 are in contact with the same carrier sleeve 74. In order to achieve both a uniform current flow and thus uniform heating, it is therefore advantageous to configure the heating conductors 18, 20 with the same length or with the same electrical resistance between all the carrier sleeves 74 which are consecutive in the current flow direction and generate such a short-circuit.

Figure 4:
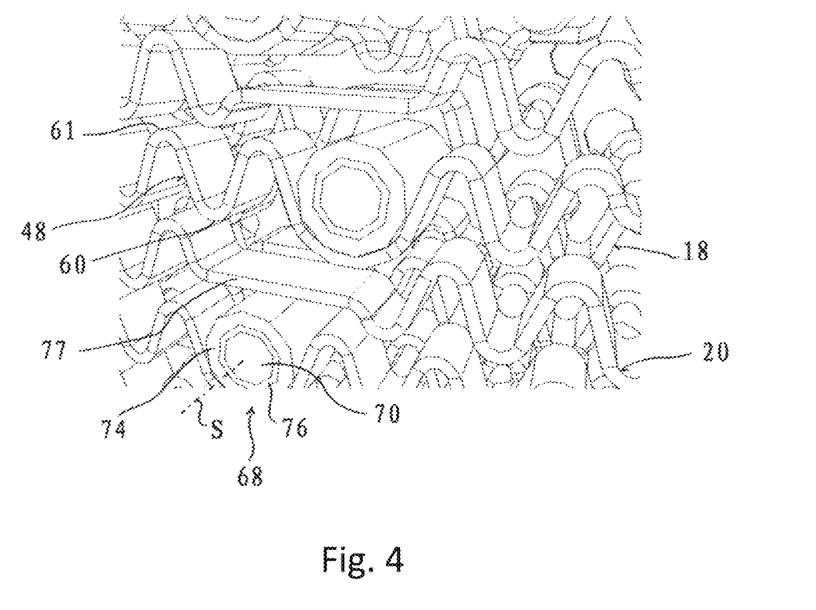
FIG. 4 shows a detailed view of the exhaust gas heater of FIGS. 1 and 2.

It is clearly apparent in FIGS. 3 to 5 that, for example, the connection of the directly adjacent meandering portions 48 in a respective heating conductor meandering field $F_1$, $F_2$ can be such that only every second meandering portion 48 is connected to a carrier element 68 or a carrier sleeve 74, while meandering portions 48 lying therebetween have an interruption of the undulating structure with a longitudinal portion 77 which extends substantially in a straight line in the meandering portion longitudinal direction M where the rows of carrier elements 68 are formed in each of the two heating conductor meandering fields $F_1$, $F_2$ in order to provide sufficient installation space for positioning a respective carrier element 68 without the risk of an electrical short-circuit.

In order in the case of the structure represented in FIGS. 1 to 5 to fundamentally avoid a short-circuit between the two heating conductors 18, 20 where this should not be the case, these can be arranged with a slight distance to one another in the direction of the exhaust gas heater longitudinal axis L. In order to achieve this, for example, the carrier sleeves can have, to generate such a space, a radially outwardly projecting spacer region against which the two heating conductors 18, 20 can axially abut where they touch a respective spacer sleeve 74.

Figure 6:
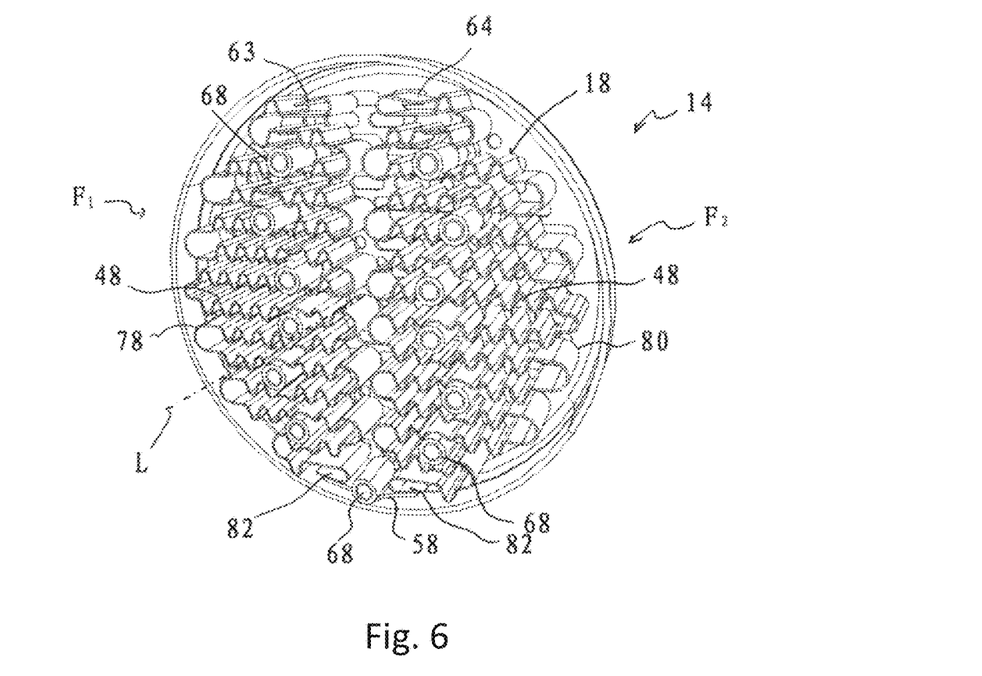
FIG. 6 shows a view, corresponding to FIG. 2, of an exhaust gas heater of an alternative embodiment.
Figure 7:
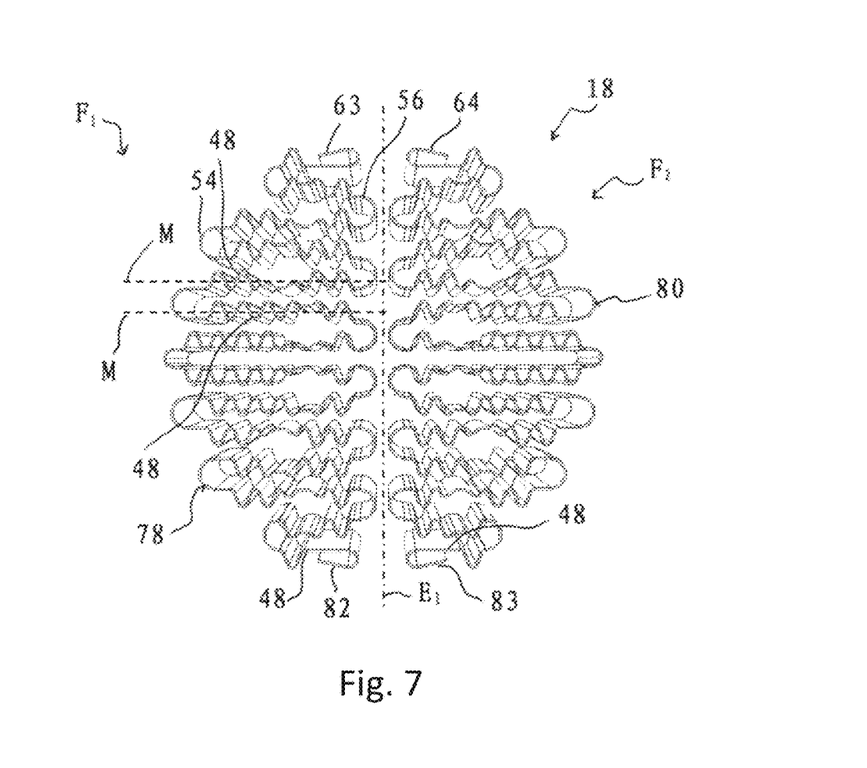
FIG. 7 shows a heating conductor, formed with two heating conductor meandering fields formed as separate material pieces, of the exhaust gas heater of FIG. 6.

An alternative configuration of an exhaust gas heater 14 is represented in FIGS. 6 and 7. In the case of this exhaust gas heater 14, in principle only one heating conductor 18 is used which can be longer in the direction of the exhaust gas heater longitudinal axis L than any of the heating conductors 18, 20 of the embodiment described above. The heating conductor 18 used in FIGS. 6 and 7 and also formed with two heating conductor meandering fields $F_1$, $F_2$ of a substantially mirror-symmetrical structure with respect to the plane of symmetry $E_1$ is constructed with two separate heating conductor material pieces 78, 80. As is apparent in FIG. 7, the fundamental profile of the heating conductor 18 is of identical configuration in the two heating conductor meandering fields $F_1$, $F_2$, as in the embodiments described above. This means that in this case too the meandering portions 48 are longitudinally extended in a respective meandering portion longitudinal direction M and formed with an undulating structure. In their meandering portion end regions 50, 52, directly adjacent meandering portions 48 are connected to one another by the meandering portion connecting portions 54, 56. It is clearly apparent in FIG. 7 that the two heating conductor material pieces 78, 80 which provide a respective heating conductor meandering field $F_1$, $F_2$ have in principle the same shape so that the substantially mirror-symmetrical structure already discussed above in relation to the plane of symmetry $E_1$ is once again achieved. This means that identical parts can be used for both heating conductor meandering fields $F_1$, $F_2$, which makes the structure simpler and of lower cost.

A connector region 63 or 64 is provided in each of the heating conductor meandering fields $F_1$, $F_2$. An in each case last meandering portion 48 configured, for example, substantially in a non-undulating manner can provide a connecting region 82, 83 in the end regions, remote from the connector regions 63 or 64, of the respective heating conductor material pieces 78, 80 or meandering fields $F_1$, $F_2$. These connecting regions 82, 83 can be connected to the meandering field connecting portion 58 now provided as a separate component in order to connect the two in principle separately constructed heating conductor meandering fields $F_1$, $F_2$ in an electrically conducting manner to one another. It is apparent in FIG. 6 that a carrier element 68 can also be assigned to this meandering field connecting portion 58 so that, in or close to the connecting regions 82, 83, the two heating conductor meandering fields $F_1$, $F_2$ are supported on the carrier housing 32 via a component which connects these electrically, namely the meandering field connecting portion 58 and a carrier element 68 connected thereto in the manner described above.

Figure 8:
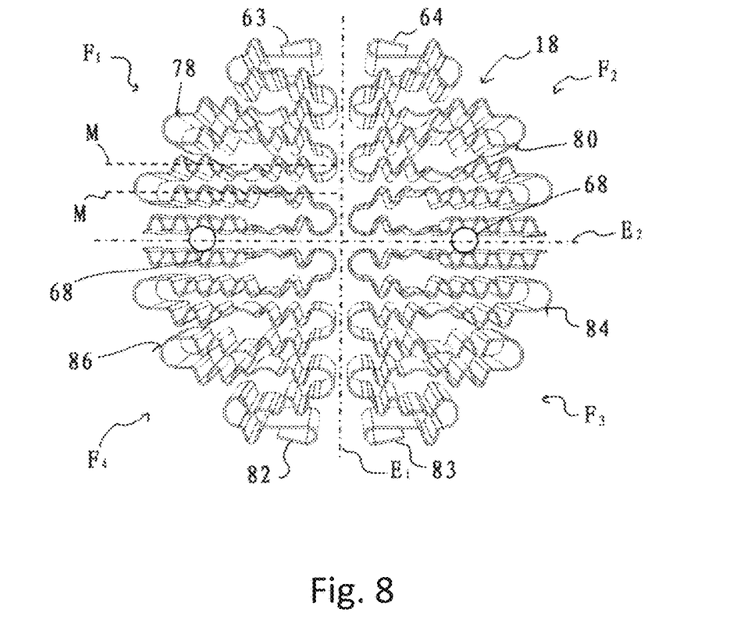
FIG. 8 shows a view, corresponding to FIG. 7, of a further alternatively configured heating conductor with four heating conductor meandering fields provided as separate material pieces.

A further embodiment of an exhaust gas heater or of a heating conductor 18 for this is represented in FIG. 8. It should be pointed out that, in the case of this embodiment, of course also in the case of the embodiment represented in FIGS. 6 and 7, the carrier housing 32 can in principle have the structure already described with reference to FIGS. 1 to 5.

The heating conductor 18 represented in FIG. 8 is constructed with a total of four heating conductor meandering fields $F_1$, $F_2$, $F_3$, $F_4$. Each of these heating conductor meandering fields $F_1$, $F_2$, $F_3$, $F_4$ is constructed with a separate heating conductor material piece 78, 80, 84, 86. The material pieces 78, 80 used to construct the first heating conductor meandering field $F_1$ and the second heating conductor meandering field $F_2$ provide the connector regions 63, 64. The material pieces 84, 86 used to construct the third heating conductor meandering field $F_3$ and the fourth heating conductor meandering field $F_4$ provide the connecting regions 82, 83 via which the third heating conductor meandering field $F_3$ and the fourth heating conductor meandering field $F_4$ can be connected to one another using the meandering field connecting portion 58 which is apparent, for example, in FIG. 6. This can in turn be supported on the carrier housing 32 via a carrier element 68.

Where the second heating conductor meandering field $F_2$ adjoins the third heating conductor meandering field $F_3$ or the first heating conductor meandering field $F_1$ adjoins the fourth adjoins the fourth heating conductor meandering field $F_4$, these can be connected to one another mechanically and in an electrically conducting manner and be supported on the housing base 34 of the carrier housing 32 via in each case a carrier element 68 represented in principle.

Heating conductor material pieces 78, 80, 84, 86 shaped or bent in an identical manner to one another can also be used in the case of the heating conductor 18 represented in FIG. 8 in order to construct the four heating conductor meandering fields $F_1$, $F_2$, $F_3$, $F_4$. This leads to heating conductor meandering fields which are adjacent to one another being formed or arranged in each case in mirror symmetry in relation to two planes of symmetry $E_1$ and $E_2$ in pairs with respect to one another.

As a result of the use of a total of four heating conductor material pieces 78, 80, 84, 86 or four heating conductor meandering fields $F_1$, $F_2$, $F_3$, $F_4$ constructed with these, the length of each individual heating conductor material piece 78, 80, 84, 86 is significantly shorter so that the process of production and/or bending is significantly easier to carry out.

Figure 9:
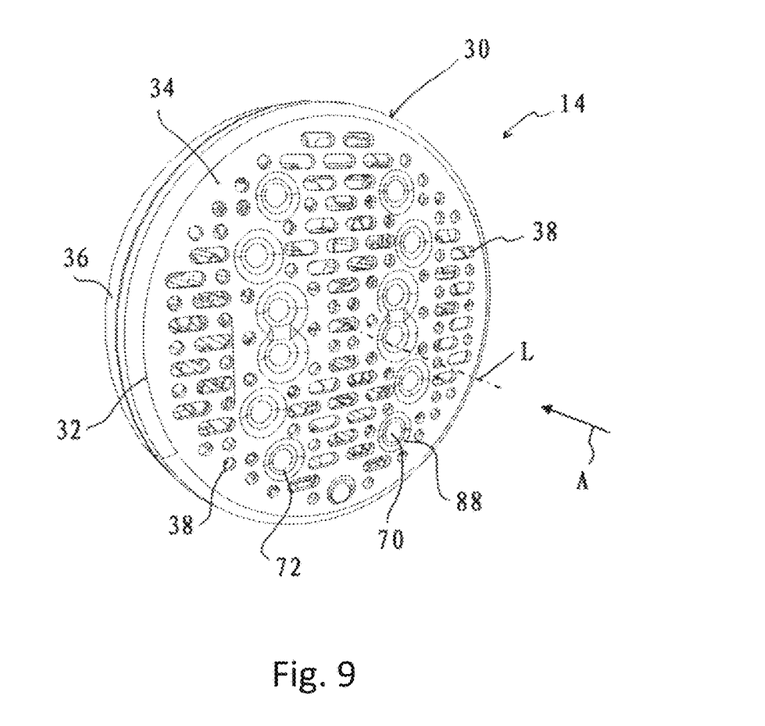
FIG. 9 shows a view, corresponding to FIG. 1, of an alternative configuration type of an exhaust gas heater.
Figure 10:
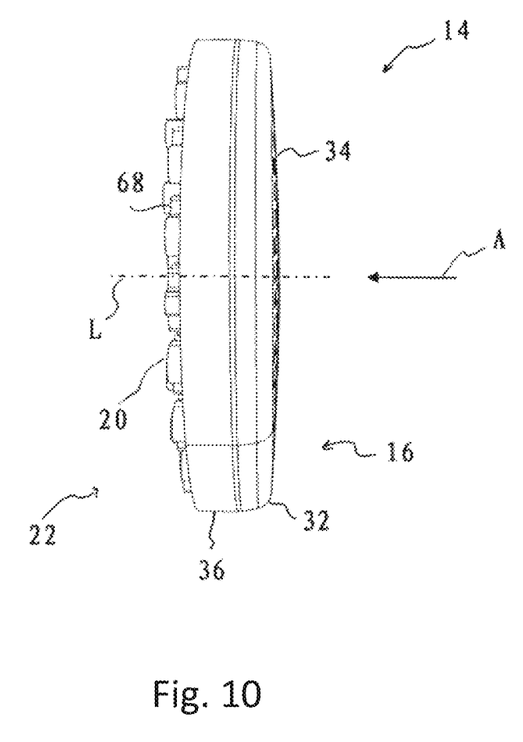
FIG. 10 shows a side view of the exhaust gas heater of FIG. 9.

FIGS. 9 and 10 show an alternative configuration of the carrier housing 32 used in the case of an exhaust gas heater 14. It is apparent in FIG. 9 that exhaust gas throughflow openings 38 of various forms are provided in the housing base 34. A part of the exhaust gas throughflow openings 38 is formed with a circular cross section, while another part is formed in the manner of an elongated hole and is, for example, longitudinally extended in a direction in which the respective meandering portions 48 are also longitudinally extended in their respective meandering portion longitudinal direction M.

As a result of the shaping or the variation in the shaping of the exhaust gas throughflow openings 38, it becomes possible to conduct the exhaust gas in a defined manner into different regions of the interior of the carrier housing 32 in order to thus achieve a defined flow onto or around the heating conductor(s). It is also apparent that axial moldings 88 can be provided on the housing base 34 where the openings 72 for receiving the carrier pins 70 are provided in the housing base 34 in order to achieve increased stability in this region.

In FIG. 10, it is apparent that the housing base 34 of the carrier housing 32, although it is in principle arranged approximately orthogonally or transversely to the exhaust gas heater longitudinal axis L, can be beveled to the outside, therefore in principle convexly. Moreover, as a result of this, on one hand the stability of the structure is increased, on the other hand a defined flow guidance of the exhaust gas to flow in the exhaust gas main flow direction A to the exhaust gas heater 14 is ensured.

It is furthermore apparent in FIG. 10 that the heating conductor(s) 18, 20 and thus also the carrier elements 68 which support these can be dimensioned so that they project on the second axial side 22 over the circumferential wall 36 of the carrier housing 32. Since, on this second axial side, the carrier housing 32 is in principle open, there is no conflict with the carrier housing 32, and the surface available for heat transmission of the heat conductor(s) 18, 20 can be further increased in size.

Figure 1:
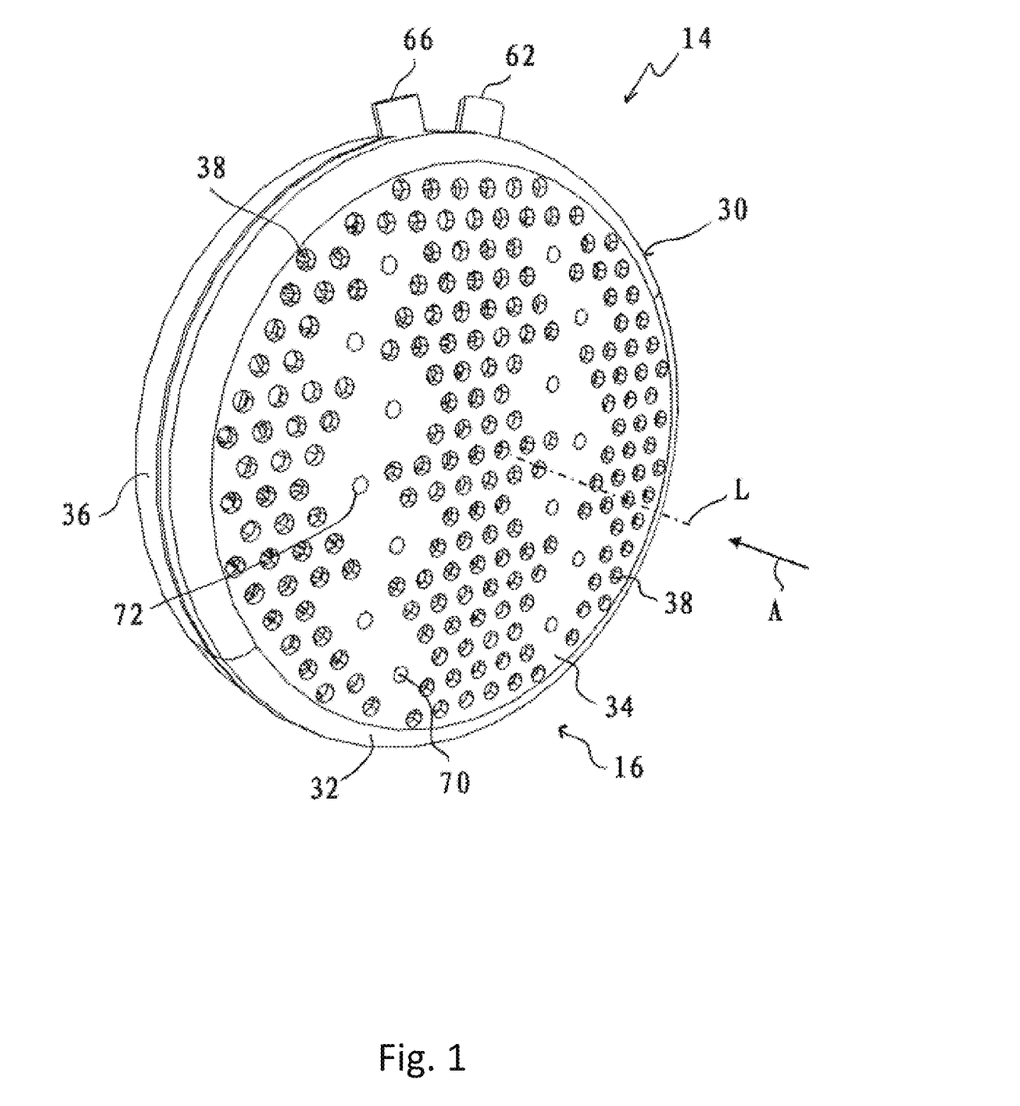
FIG. 1 shows a perspective view of an exhaust gas heater viewed on a first axial side oriented, for example, in the direction upstream in relation to an exhaust gas main flow direction.
Figure 2:
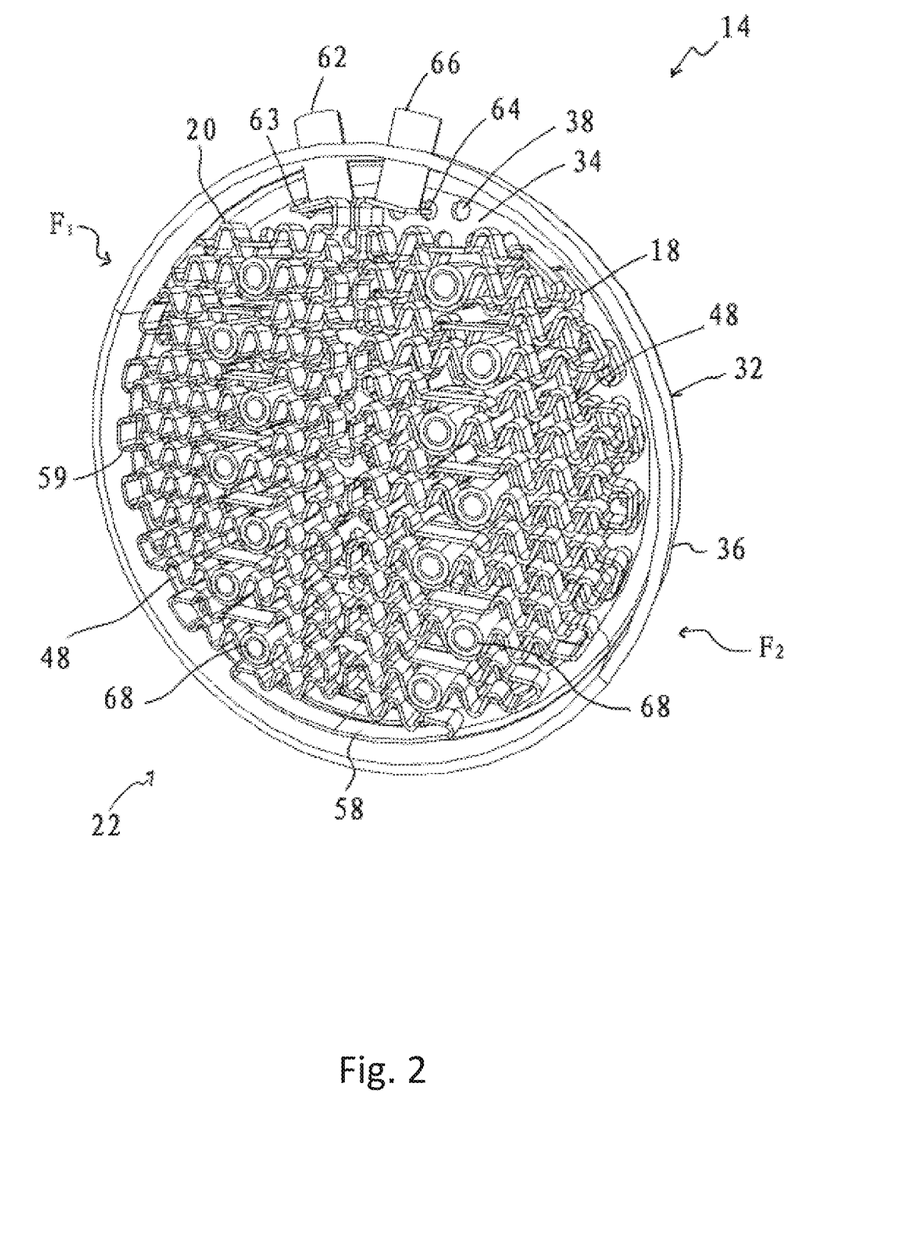
FIG. 2 shows a perspective view of the exhaust gas heater represented in FIG. 1, viewed on a second axial side oriented, for example, in the direction downstream in relation to the exhaust gas main flow direction.

It should be pointed out that the structure described above with reference to FIG. 10 of the carrier housing 32 or of the heating conductors 18, 20 received therein can of course be provided independently of the shaping or arrangement represented in FIG. 9 or in FIG. 1 of the exhaust gas passage openings 38 and also irrespective of whether a heating conductor which is slightly further expanded in the axial direction or two or more heating conductors arranged consecutively in the axial direction are provided in the carrier housing 32.

It is understood that the foregoing description is that of the preferred embodiments of the invention and that various changes and modifications may be made thereto without departing from the spirit and scope of the invention as defined in the appended claims.

The invention claimed is:

1. An exhaust gas heater for an exhaust gas system of an internal combustion engine, the exhaust gas heater defining a longitudinal axis and comprising:
   a carrier arrangement for accommodating an exhaust gas can flow therethrough in the direction of said longitudinal axis;
   at least one heating conductor supported on said carrier arrangement;
   said carrier arrangement including a carrier housing having a housing base arranged on a first axial side of said at least one heating conductor and extending transversely to the exhaust gas heater longitudinal axis, said housing base having a multiplicity of exhaust gas throughflow openings formed therein, said carrier arrangement further including a multiplicity of carrier elements on said housing base for supporting said at least one heating conductor;
   said at least one heating conductor being made of bent flat material defining a heating conductor profile;
   said heating conductor profile being meandering at least in regions thereof;
   said at least one heating conductor having flat end faces lying opposite from each other and having heating conductor broad sides lying opposite each other;
   said at least one heating conductor defining at least one heating conductor meandering field and having a plurality of mutually parallel meandering sections longitudinally extending in a direction of a meandering section longitudinal direction (M);
   each two mutually adjacent meandering sections having respective meandering section end regions and being connected to each other at one of said meandering section end regions thereof via a corresponding meandering section connecting section transverse to said meandering section longitudinal direction (M) and, between said meandering section end regions thereof and in at least a portion thereof, being configured with a multiplicity of consecutive wave crests in the meandering section longitudinal direction (M) for providing an undulating structure of said mutually adjacent meandering sections meandering sections;
   at least one of said carrier elements including a carrier pin fixed on said housing base, a carrier sleeve supported on said carrier pin and electrically insulating material interposed therebetween; and
   said carrier sleeve being fixed to one of said mutually adjacent meandering sections at one of said wave crests by material connection.

2. The exhaust gas heater of claim 1, wherein said at least one heating conductor is arranged to extend in the direction of said longitudinal axis with said heating conductor broad sides and with said flat end faces arranged to extend orthogonally to said longitudinal axis.

3. The exhaust gas heater of claim 1, wherein said at least one heating conductor includes at least first and second heating conductor meandering fields;
   said first heating conductor meandering field provides a first connector region for connecting said at least one heating conductor to a voltage source; and,
   said second heating conductor meandering field provides a second connector region for connecting said at least one heating conductor to said voltage source.

4. The exhaust gas heater of claim 3, wherein said first and second heating conductor meandering fields are provided by separate heating conductor material pieces.

5. The exhaust gas heater of claim 4, wherein at least said first and second heating conductor meandering fields provided by separate heating conductor material pieces are formed to have the same shape as one another.

6. The exhaust gas heater of claim 5, wherein at least said first and second heating conductor meandering fields provided by said separate heating conductor material pieces are arranged in mirror symmetry to one another in relation to a plane of symmetry containing said heating conductor longitudinal axis.

7. The exhaust gas heater of claim 5, wherein said heating conductor is formed with said first and second heating conductor meandering fields provided by said separate heating conductor material pieces and said first and second heating conductor meandering fields are arranged in mirror symmetry to one another in relation to a plane of symmetry containing the heating conductor longitudinal axis.

8. The exhaust gas heater of claim 5, wherein the heating conductor is formed with said first and second heating conductor meandering fields and third and fourth heating conductor meandering fields provided by separate heating conductor material pieces and the four heating conductor meandering fields are arranged in corresponding pairs in mirror symmetry to one another in relation to two planes of symmetry which contain the heating conductor longitudinal axis and are orthogonal to one another.

9. The exhaust gas heater of claim 4, wherein at least said first and second heating conductor meandering fields are provided as separate heating conductor material pieces and are connected to one another in an electrically conducting manner via at least one carrier element supporting the latter on the carrier housing.

10. The exhaust gas heater of claim 1, wherein said at least one heating conductor meandering field is provided by a single heating conductor material piece.

11. The exhaust gas heater of claim 10, wherein all of said heating conductor meandering fields are provided by a single heating conductor material piece.

12. The exhaust gas heater of claim 1, wherein:
said at least one carrier element defines a carrier element longitudinal axis arranged parallel to said exhaust gas heater longitudinal axis.

13. The exhaust gas heater of claim 12, wherein said electrically insulating material is magnesium oxide material.

14. The exhaust gas heater of claim 12, wherein at least one of the following applies:
   i) said carrier housing as well as said carrier pin and said carrier sleeve of said at least one carrier element are made with metal material; and,
   ii) said carrier pin of said at least one carrier element is connected to said housing base by a material connection.

15. The exhaust gas heater of claim 1, wherein said material connection is a welded connection or solder connection.

16. The exhaust gas heater of claim 1, wherein said carrier housing has a circumferential wall adjoining said housing base radially on the outside thereof.

17. The exhaust gas heater of claim 16, wherein said carrier housing is formed in a pot-shaped manner with said housing base and said circumferential wall; and, wherein at least one of the following applies:
   i) said at least one heating conductor is on a second axial side and is uncovered by said carrier arrangement; and,
   ii) said at least one heating conductor is on the second axial side and projects axially over said circumferential wall.

18. The exhaust gas heater of claim 1, wherein the undulating structure of the other one of said mutually adjacent meandering sections is interrupted for providing a straight-line extension of the other one of said mutually adjacent meandering sections in the meandering section longitudinal direction (M) adjacent to the one of said wave crests of the one of said two mutually adjacent meandering sections having said carrier sleeve fixed thereto.

19. An exhaust gas system for an internal combustion engine, the exhaust gas system comprising:
   at least one exhaust gas treatment unit; and,
   at least one exhaust gas heater arranged in an exhaust gas main flow direction upstream relative to said at least one exhaust gas treatment unit;
   said at least one exhaust gas heater defining a longitudinal axis and including:
   a carrier arrangement for accommodating an exhaust gas can flow therethrough in the direction of said longitudinal axis;
   at least one heating conductor supported on said carrier arrangement;
   said carrier arrangement including a carrier housing having a housing base arranged on a first axial side of said at least one heating conductor and extending transversely to the exhaust gas heater longitudinal axis, said housing base having a multiplicity of exhaust gas throughflow openings formed therein, said carrier arrangement further including a multiplicity of carrier elements on said housing base for supporting said at least one heating conductor:
   said at least one heating conductor being made of bent flat material defining a heating conductor profile;
   said heating conductor profile being meandering at least in regions thereof; and,
   said at least one heating conductor having flat end faces lying opposite from each other and having heating conductor broad sides lying opposite each other;
   said at least one heating conductor defining at least one heating conductor meandering field and having a plurality of mutually parallel meandering sections longitudinally extending in a direction of a meandering section longitudinal direction (M);
   each two mutually adjacent meandering sections having respective meandering section end regions and being connected to each other at one of said meandering section end regions thereof via a corresponding meandering section connecting section transverse to said meandering section longitudinal direction (M) and, between said meandering section end regions thereof and in at least a portion thereof, being configured with a multiplicity of consecutive wave crests in the meandering section longitudinal direction (M) for providing an undulating structure of said mutually adjacent meandering sections meandering sections;
   at least one of said carrier elements including a carrier pin fixed on said housing base, a carrier sleeve supported on said carrier pin and electrically insulating material interposed therebetween; and
   said carrier sleeve being fixed to one of said mutually adjacent meandering sections at one of said wave crests by material connection.

20. The exhaust gas system of claim 19, wherein said at least one exhaust gas treatment unit comprises at least one of the following: a catalytic converter and a particle filter.

21. The exhaust gas system of claim 19, wherein the undulating structure of the other one of said mutually adjacent meandering sections is interrupted for providing a straight-line extension of the other one of said mutually adjacent meandering sections in the meandering section longitudinal direction (M) adjacent to the one of said wave crests of the one of said two mutually adjacent meandering sections having said carrier sleeve fixed thereto.

* * * * *